(12) United States Patent
Sunwoo et al.

(10) Patent No.: US 12,520,443 B2
(45) Date of Patent: Jan. 6, 2026

(54) FLEXIBLE HYBRID COVER WINDOW AND METHOD OF MANUFACTURING SAME

(71) Applicant: UTI INC., Yesan-gun (KR)

(72) Inventors: Kukhyun Sunwoo, Yesan-gun (KR); Tea Joo Ha, Yesan-gun (KR); Hee Jun Ahn, Yesan-gun (KR); Seok Pil Jin, Yesan-gun (KR); Jae Suk Oh, Yesan-gun (KR); Joo Seok Lee, Yesan-gun (KR)

(73) Assignee: UTI INC., Yesan-gun (KR)

( * ) Notice: Subject to any disclaimer, the term of this patent is extended or adjusted under 35 U.S.C. 154(b) by 254 days.

(21) Appl. No.: 18/107,413

(22) Filed: Feb. 8, 2023

(65) Prior Publication Data
US 2023/0269896 A1 Aug. 24, 2023

(30) Foreign Application Priority Data
Feb. 18, 2022 (KR) .................. 10-2022-0021204

(51) Int. Cl.
| | |
|---|---|
| *H05K 5/03* | (2006.01) |
| *B32B 7/12* | (2006.01) |
| *B32B 17/10* | (2006.01) |
| *B32B 27/28* | (2006.01) |
| *B32B 27/08* | (2006.01) |
| *B32B 27/36* | (2006.01) |

(52) U.S. Cl.
CPC .............. *H05K 5/03* (2013.01); *B32B 7/12* (2013.01); *B32B 17/10027* (2013.01); *B32B 17/1055* (2013.01); *B32B 27/281* (2013.01); *B32B 27/08* (2013.01); *B32B 27/36* (2013.01); *B32B 2250/40* (2013.01); *B32B 2255/10* (2013.01); *B32B 2307/732* (2013.01)

(58) Field of Classification Search
CPC ........................................................ B32B 7/12
See application file for complete search history.

(56) References Cited

U.S. PATENT DOCUMENTS

| | | | | |
|---|---|---|---|---|
| 2017/0192462 A1* | 7/2017 | Kim | ................ | B32B 27/40 |
| 2018/0355172 A1* | 12/2018 | Uno | ................ | C08K 3/36 |
| 2020/0209925 A1* | 7/2020 | Paek | ................ | H10K 77/111 |
| 2022/0282130 A1* | 9/2022 | Baby | ................ | C09J 9/00 |
| 2022/0332989 A1* | 10/2022 | Park | ................ | C09J 133/08 |

FOREIGN PATENT DOCUMENTS

| | | |
|---|---|---|
| KR | 10-2018-0093007 A | 8/2018 |
| KR | 10-2022-0016257 A | 2/2022 |

\* cited by examiner

*Primary Examiner* — Zachary M Davis
(74) *Attorney, Agent, or Firm* — Stein IP, LLC

(57) ABSTRACT

Proposed are a hybrid flexible cover window and a method of manufacturing the same. The hybrid flexible cover window includes a flat portion formed on a flat area of a flexible display and a folding portion which is formed in succession to the flat portion and formed in a folding area of the flexible display. The hybrid flexible cover window includes a substrate, a transparent polyimide layer formed on the glass substrate, and an adhesive buffer layer formed between the glass substrate and the TPI layer, in which the TPI layer has a UV cut-off wavelength of less than 380 nm.

10 Claims, 12 Drawing Sheets

FLEXIBLE HYBRID COVER WINDOW AND METHOD OF MANUFACTURING SAME

The present application claims priority to Korean Patent Application No. 10-2022-0021204, filed Feb. 18, 2022, the entire contents of which is incorporated herein for all purposes by this reference.

BACKGROUND OF THE INVENTION

1. Field of the Invention

The present disclosure relates to a flexible cover window and more particularly relates to a flexible hybrid cover window in which a glass substrate and a transparent polyimide layer (TPI) are combined.

2. Description of the Related Art

In recent years, electrical and electronic technologies have developed rapidly, and various types of display products have been released to meet the needs of the new era and various consumers. Among them, flexible displays that can be folded and unfolded are being actively researched.

For flexible displays, research is not only focused on folding but also conducted on bending, rolling, and stretching. To implement flexible displays, cover windows that are used to protect display panels need to be flexible as well as the display panels.

Such a flexible cover window has to basically have good flexibility, should not leave marks on the folded portion even though repeatedly folded and unfolded, and should not cause distortion of image quality.

Existing flexible cover windows have used a polymer film such as polyimide (PI) on the surface of a display panel.

However, a polymer film made of polyimide (PI) has weak mechanical strength and thus simply serves to prevent scratches on a display panel. In addition, the polymer film made of PI is vulnerable to impact resistance, has low transmittance, and is known to be relatively expensive.

In addition, in the case of such a polymer film, as the number of folding and unfolding the display increases, a delamination or buckling phenomenon, which leaves marks in the folding portion, frequently occurs.

This phenomenon occurs more severely as the thickness or hardness of the cover window increases, and section of a cover window material has been constrained by the thickness and hardness of the cover window.

In other words, if the thickness of the cover window is relatively thin, the above-described phenomenon less occurs because the deformation is small when the cover window is bent. However, as the thickness of the cover window increases, or the hardness of the cover window increases, the deformation upon bending increases, making such a cover window difficult to be applied.

In addition, since polymer films generally have cut-off characteristics in the entire range of ultraviolet rays, it is difficult to apply an ultraviolet curing process when implementing an adhesive layer for bonding a display panel and a polymer film thereafter. In this case, since the adhesive layer is incompletely cured, the bonding strength between the display panel and the polymer film is insufficient, resulting in reduction in the lifespan of the cover window.

In this situation, in order to overcome the limitations of the cover window of the existing polymer film, research is needed on the structure and material of the cover window being free of the deformation problem in the folding portion, satisfying the required strength and folding characteristics, and enabling complete curing of an adhesive layer.

SUMMARY OF THE INVENTION

The present disclosure is derived from the above necessity, and an objective of the present disclosure is to provide a flexible hybrid cover window in which a glass substrate and a transparent polyimide (TPI) layer are combined.

The technical gist of the present disclosure for achieving the above objective is a flexible hybrid cover window including a flat portion formed on a flat area of a flexible display and a folding portion, which is formed in succession to the flat portion formed on the folding area of the flexible display, in which the flexible hybrid cover window includes a glass substrate, a transparent polyimide layer (TPI) layer formed on the glass substrate, and an adhesive buffer layer formed between the glass substrate and the TPI layer, in which the TPI layer has a UV cut-off wavelength of less than 380 nm.

In addition, another technical gist of the present disclosure for achieving the above objective is a method for manufacturing a flexible cover window including a flat portion formed on a flat area of a flexible display, and a folding portion, which is formed in succession to the flat portion, formed on the folding area of the flexible display, the method including: a first step of loading a glass substrate on a carrier substrate; a second step of forming an adhesive buffer layer on the glass substrate; a third step of forming a TPI layer on the adhesive buffer layer, a fourth step of forming a hybrid structure including a TPI layer/adhesive buffer layer/glass substrate by curing the adhesive buffer layer by applying ultraviolet rays to either the glass substrate or the TPI layer or to both the glass substrate or the TPI layer; and a fifth step of separating the hybrid structure from the carrier substrate, in which the TPI layer has a UV cut-off wavelength of less than 380 nm.

In addition, the TPI layer is preferably formed on the front surface of the glass substrate or formed on both the front surface and the back surface of the glass substrate, respectively.

In addition, the adhesive buffer layer is preferably formed between the glass substrate and the TPI layer or formed between the glass substrate and the TPI layer and subsequently formed on a side surface of the glass substrate.

In addition, it is preferable that a functional layer is formed on the TPI layer formed on the front surface of the glass substrate or a functional layer is formed on each of the TPI layers formed on the front surface and the back surface.

In addition, it is preferable that the functional layer is a hard coating layer, an AF coating layer or a stacked structure in which the AF coating layer is stacked on the hard coating layer.

In addition, the adhesive buffer layer is preferably made of optical clear resin (OCR), and the storage modulus of the OCR adhesive buffer layer is preferably 0.01 to 1 GPa.

In addition, it is preferable to adjust the curing degree of the adhesive buffer layer by applying ultraviolet rays to either the glass substrate or the TPI layer or to both the glass substrate or the TPI layer.

In addition, it is preferable that the adhesive buffer layer is completely cured and may be relatively partially cured in the folding portion compared to the flat portion, if necessary.

In addition, it is preferable that a printed layer is formed on the glass substrate or the TPI layer.

In addition, it is preferable that a protective film is formed on the outermost layer of the flexible cover window.

In addition, the TPI layer preferably has a thickness in a range of 1 to 50 μm.

The present disclosure provides a flexible hybrid cover window in which a glass substrate and a TPI layer are combined. Specifically, in the present disclosure, since the UV cut-off wavelength of the TPI layer is formed to be 380 nm or less, the transmission of ultraviolet rays for curing the adhesive buffer layer is possible through the TPI layer. Therefore, it is possible to implement complete curing of the adhesive buffer layer for bonding between the glass substrate and the TPI layer, and the adhesion between the glass substrate and the TPI layer is excellent, thereby improving overall durability.

In addition, the transmission of ultraviolet rays is possible not only on the glass substrate side but also on the TPI layer side so that various variables in the structure of the product or manufacturing process can be accommodated. Therefore, the adhesive buffer layer can be cured without an ultraviolet transmission barrier to the printed layer even for products having various structures, for example, a product having a bezel printed layer formed on the glass substrate or TPI layer, thereby promoting convenience in the process.

In addition, the present disclosure provides a flexible hybrid cover window of a glass substrate and a TPI layer, thereby reducing the overall thickness of the flexible cover window while maximally maintaining the unique texture of the glass, absorbing impact such as a pen-drop by the TPI layer, and minimizing deformation in the folding portion by the adhesive buffer layer to further improve impact resistance and durability.

DESCRIPTION OF THE PREFERRED EMBODIMENTS

The present disclosure relates to a flexible cover window and relates to a flexible hybrid cover window in which a glass substrate and a transparent polyimide layer (TPI) are combined.

In particular, in the present disclosure, since the UV cut-off wavelength of the TPI layer is formed to be 380 nm or less, the transmission of ultraviolet rays for curing the adhesive buffer layer is possible through the TPI layer. Therefore, it is possible to implement complete curing of the adhesive buffer layer for bonding between the glass substrate and the TPI layer, and the adhesion between the glass substrate and the TPI layer is excellent, thereby improving overall durability.

Figure 1:
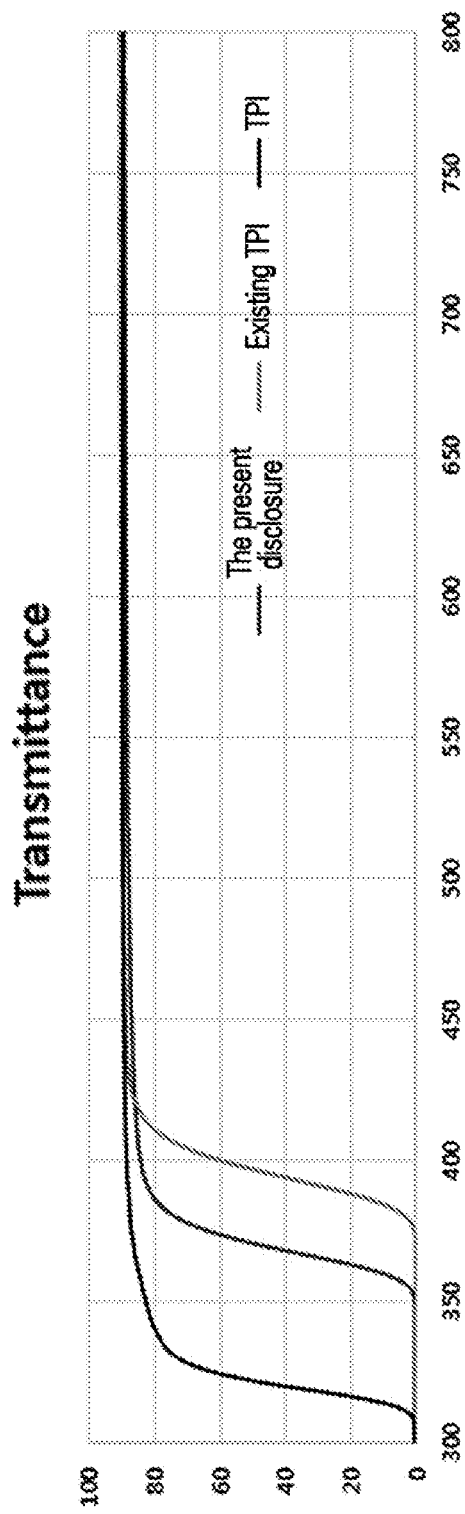
FIG. 1 is a diagram showing the transmittance of the present disclosure and existing polymer materials.

Hereinafter, various embodiments of the present disclosure will be described in detail with reference to the accompanying drawings. FIG. 1 shows the transmittance of the present disclosure and existing polymer materials, and FIGS. 2 to 12 are schematic diagrams showing various embodiments of the present disclosure.

As shown, the flexible hybrid cover window, according to the present disclosure, is a flexible cover window including a flat portion formed on a flat area of a flexible display and a folding portion, which is formed in succession to the flat portion formed on the folding area of the flexible display, the flexible hybrid cover window includes a glass substrate (100), a transparent polyimide layer (TPI) layer formed on the glass substrate (100), and an adhesive buffer layer (200) formed between the glass substrate (100) and the TPI layer (310), in which the TPI layer (310) has a UV cut-off wavelength of less than 380 nm.

In the present disclosure, the folding area of the flexible display refers to an area where the display is folded in half, bent, or rolled, and the area where the cover window is folded corresponding to this area is referred to as the "folding portion" of the cover window in the present disclosure, and a flat area other than the folding portion is referred to as a "flat portion" of the cover window. In general, the flat portion and the folding portion are formed in succession.

In addition, the front surface in the present disclosure means a surface that can be touched by a user, and means a surface that is contacted by a touch pen, etc., and means a surface in an upward direction in the drawing. The back surface in the present disclosure is a surface opposite to the front surface and means a surface opposite to the touch, that is, a surface in a direction toward the display panel and means a surface in a downward direction in the drawing.

The present disclosure is a complex implementation of a glass substrate (100) and a TPI layer (Transparent Polyimide Layer) (310). Specifically, in the present disclosure, since the UV cut-off wavelength of the TPI layer (310) is formed to be 380 nm or less, the transmission of ultraviolet rays for curing the adhesive buffer layer (200) is possible through the TPI layer (310). Therefore, it is possible to implement complete curing of the adhesive buffer layer (200) for bonding between the glass substrate (100) and the TPI layer (310), and the adhesion between the glass substrate (100) and the TPI layer (310) is excellent, thereby improving overall durability.

The present disclosure is used as a protective cover window for flexible display panels of various types, such as foldable, rollable, slidable, and stretchable, and is stacked and laminated on the front surface of the flexible display panel.

In addition, the glass substrate (100), according to the present disclosure, is chemically strengthened and is formed flat as a whole (the thickness of the folding portion and the flat portion are the same), or the folding portion is formed by slimming to be thinner than the flat portion, or the one or more folding portions may be segmented so that the glass substrate (100) as a whole may be formed into two pieces, three pieces, or the like.

Generally, the thickness of the flat portion of the cover window is 30 to 300 μm, and when the folding portion is slimmed, the thickness of the folding portion is about 10 to 100 μm. Here, the folding portion may have a uniform thickness or may be formed to have a thickness gradually increasing from the center of the folding portion toward either end portion thereof. That is, the folding portion may be formed in a straight or curved shape.

In addition, in order to improve strength and folding characteristics, an etched pattern may be formed on both a folding portion and a flat portion or a folding portion of the glass substrate (100).

The TPI layer (310), according to the present disclosure, may be formed on the front surface of the glass substrate (100) or formed on both the front surface and the back surface of the glass substrate (100), respectively.

That is, the cover window, according to the present disclosure, is formed of a composite material including a glass substrate (100) and a TPI layer (310), in which the TPI layer (310) is formed on the front surface of the glass substrate (100) or the TPI layer (310) is formed on both sides (front and back surfaces) of the glass substrate (100), respectively.

In this way, the TPI layer (310) is formed on one or both sides of the glass substrate (100) to improve surface hardness, improve folding characteristics, and evenly disperse impact forces, especially to disperse and absorb impact forces such as pen-drop.

In general, when a glass-based flexible cover window is to be implemented, the thickness of the glass substrate (100) must be thin, but the glass substrate (100) must have at least a certain thickness in order to secure strength characteristics.

For example, when the radius of curvature must satisfy at least 0.5 mm or more during folding, the cover window may have a thickness of 200 μm or less, preferably 20 to 100 μm, and the thinner the thickness, the weaker the strength. In particular, when an object having a narrow cross-section such as a pen drops and impacts the upper surface (front surface) of the glass substrate (100), the entire glass substrate (100) may be deformed or damaged around the pen-drop contact portion.

Specifically, in the case of a cover window having a slimmed folding portion, since the thickness of the slimmed portion is particularly thin, the cover window is vulnerable to an impact such as a pen drop. In addition, since there is a stress difference between the folding portion and the flat portion due to a thickness difference, the glass substrate (100) suffers a problem such as waviness. Due to these problems, such a cover window is very vulnerable to impact.

The present disclosure provides a flexible hybrid cover window made of a composite material including a TPI layer (310) of a polymer material and a glass substrate (100). In order to improve impact resistance through the improvement of pen drop characteristics in the folding portion while improving overall strength and simultaneously improving folding characteristics, a TPI layer (310) is formed on the entire surface of one or both surfaces of the glass substrate (100).

The TPI layer (310), according to the present disclosure, is formed to have a UV cut-off wavelength of 380 nm or less.

The TPI layer (310), according to the present disclosure, may be formed as a film or a coating layer using a coating solution. Since the TPI layer (310) forms a hybrid structure laminated on a glass substrate (100), the TPI layer (310) is formed to have an appropriate thickness to maintain strength characteristics and folding characteristics while preventing the overall thickness from being too thick, and preferably, the TPI layer (310) has a thickness of 1 to 50 μm.

In general, the TPI layer (310) has the property of blocking ultraviolet rays, but the TPI layer (310), according to the present disclosure, has a property of having an UV cut-off wavelength of 380 nm or less, preferably 360 nm.

As shown in FIG. 1, the existing TPI layer (310) has a cut-off characteristic in the entire range of ultraviolet rays, so it is difficult to apply an ultraviolet curing process when implementing 20) an adhesive layer for bonding with a display panel thereafter. That is, since the adhesive layer is incompletely cured, the adhesion between the display panel and the TPI layer (310) is not properly performed, thereby reducing the lifespan of the cover window.

As shown in FIG. 1, the TPI layer (310), according to the present disclosure, has a transmittance graph shifted to the left, a UV cut-off wavelength is formed to be 380 nm or less, and thus ultraviolet rays may be transmitted, and thus ultraviolet rays may be applied through the TPI layer (310) when the adhesive buffer layer (200) according to the present disclosure is cured.

Therefore, it is possible to realize complete curing of the adhesive buffer layer (200) for bonding between the glass substrate (100) and the TPI layer (310) so that the adhesion between the glass substrate (100) and the TPI layer (310) is excellent, thereby improving the durability of the cover window.

In addition, the transmission of ultraviolet rays is possible not only on the glass substrate side but also on the TPI layer (310) side so that various variables in the structure of the product or manufacturing process can be accommodated. Therefore, the adhesive buffer layer (200) can be cured without an ultraviolet transmission barrier to the printed layer (400) even for products having various structures, for example, a product having a bezel printed layer (400) formed on the glass substrate (100) or TPI layer (310).

The TPI constituting the TPI layer (310), according to the present disclosure, may be provided in the form of a film by coating a substrate with a polyamic acid (PAA) solution formed through a condensation polymerization reaction, followed by imidization and drying.

The TPI layer (310) may be directly laminated on the adhesive buffer layer (200), and then a functional layer (hard coating layer (320) or AF coating layer (330) may be formed thereon or may be provided as a structure in which a functional layer is formed on the TPI layer (310), and thus may be laminated on the adhesive buffer layer (200).

The TPI layer (310) uses a method of polymerizing with an anhydride or including fluorine in a polymer chain in order to reduce the charge transfer complex (CTC) of polyimide (PI), and the TPI layer (310) formed thereby has high visible light transmittance and excellent optical transparency having a cut-off wavelength of 296 to 358 nm and can transmit ultraviolet rays so that the degree of curing of the adhesive buffer layer (200) can be adjusted through the TPI layer (310). That is, the degree of curing of the adhesive buffer layer (200) can be adjusted by adjusting the intensity of ultraviolet rays from the side of the TPI layer (310).

The adhesive buffer layer (200), according to the present disclosure, is made of optical clear resin (OCR) and is coated on the glass substrate (100) to a thickness of about 1 to 75 μm. The adhesive buffer layer (200) basically combines the glass substrate (100) and the TPI layer (310), maintains an appropriate thickness and elasticity, and minimizes deformation in the folding portion by the adhesive buffer layer (200), thereby further improving impact resistance and durability.

The adhesive buffer layer (200) may be formed between the glass substrate (100) and the TPI layer (310) or may be formed between the glass substrate (100) and the TPI layer (310) and subsequently formed on a side surface of the glass substrate (100). That is, the adhesive buffer layer (200) may be formed by wrapping the entire area of the glass substrate (100). This makes it possible to protect not only the front or back surface of the glass substrate (100) but also the side surface.

The adhesive buffer layer (200) uses a transparent resin having almost the same glass refractive index of 1.5, and for example, acrylic, epoxy, silicone, urethane, urethane composite, urethane acrylic composite, hybrid sol-gel, siloxane-based, etc., may be used. The adhesive buffer layer (200) is formed by adjusting the hardness of the adhesive buffer layer (200) by selecting curing conditions or materials.

The storage modulus of the OCR adhesive buffer layer (200) is preferably 0.01 to 1 GPa. As a result, OCR, which is harder than the existing OCA, is applied as an adhesive buffer layer (200) 200, thereby increasing the surface hardness, improving the overall durability, and minimizing deformation at the interface even with impacts such as pen drop.

That is, an adhesive buffer layer (200) is formed on a glass substrate (100), a TPI layer (310) is formed on the adhesive buffer layer (200), and ultraviolet rays are applied to either the glass substrate (100) or the TPI layer (310) or to both the glass substrate (100) or the TPI layer (310) to cure the adhesive buffer layer (200), thereby bonding the TPI layer (310) and the glass substrate (100).

Here, even when a bezel printed layer (400) is formed on the glass substrate (100), ultraviolet rays can be applied through the TPI layer (310) according to the present disclosure having a UV cut-off wavelength of 380 nm or less so that the adhesive buffer layer (200) can be cured without the UV transmission barrier by the bezel printed layer (400). That is, uniform curing is possible over the entire area of the adhesive buffer layer (200) without the area being covered by the bezel printed layer (400).

In addition, when the bezel printed layer (400) is formed on the TPI layer (310), since ultraviolet rays can be applied from the glass substrate side, various variables in the structure of the product or process can be accommodated. Therefore, the adhesive buffer layer (200) can be cured without an ultraviolet transmission barrier to the printed layer (400) even for products having various structures, for example, a product having a bezel printed layer (400) formed on the glass substrate (100) or TPI layer (310).

The adhesive buffer layer (200), according to the present disclosure, is preferably completely cured for strong bonding between the glass substrate (100) and the TPI layer (310), but the adhesive buffer layer (200) may be partially cured if necessary. That is, a softer adhesive buffer layer (200) may be implemented to absorb impact relief or impact from deformation in the folding portion. This can be applied by adjusting the degree of curing according to product specifications or materials.

If necessary, the adhesive buffer layer (200) may be relatively partially cured in the folding portion compared to the flat portion. That is, it is possible to realize soft curing in the folding portion and complete curing in the flat portion. This can be implemented by adjusting the intensity of ultraviolet rays using a mask or the like through the TPI layer (310) according to the present disclosure.

In one embodiment of the present disclosure, complete curing of the adhesive buffer layer (200) may be achieved by irradiating ultraviolet rays at 150 to 600 mW for 1 to 10 seconds, and partial curing (soft curing) is performed by irradiating ultraviolet rays at 5 to 30 mW for 1 to 40 seconds.

As such, the hybrid structure constituting the flexible hybrid cover window, according to the present disclosure, is basically implemented as a TPI layer/adhesive buffer layer/glass substrate. Furthermore, when the TPI layer (310) is formed on both sides of the glass substrate (100), it is implemented as a TPI layer/adhesive buffer layer/glass substrate/adhesive buffer layer/TPI layer.

Meanwhile, a functional layer may be further formed on the TPI layer (310) according to the present disclosure. The functional layer formed on the front surface may be implemented as a hard coating layer (320) or an AF coating layer (330), or both may be formed. In this case, it is preferable that the AF coating layer (330) is formed on the hard coating layer (320).

The functional layer may be formed on the TPI layer (310) formed on the front surface of the glass substrate (100) or may be formed on the TPI layer (310) formed on the front surface and the back surface of the glass substrate (100), respectively. That is, when the TPI layer (310) is formed on both sides of the glass substrate (100), the functional layer may be formed only on the front surface or both on the front and back surfaces.

The TPI layer (310), according to the present disclosure, may be laminated on the adhesive buffer layer (200), and then a hard coating layer (320) or an AF coating layer (330) may be formed thereon or may manufacture a structure in which a hard coating layer (320) or an AF coating layer (330) is formed on the TPI layer (310) through a separate process and may be simultaneously laminated on the adhesive buffer layer (200). That is, a structure in which the functional layer/TPI layer is integrally formed may be formed on the adhesive buffer layer (200).

When the functional layer is implemented, the embodiment of the hybrid structure constituting the flexible hybrid cover window, according to the present disclosure, may be any one of a hard coating layer/TPI layer/adhesive buffer layer/glass substrate, AF coating layer/TPI layer/adhesive buffer layer/glass substrate, AF coating layer/hard coating layer/TPI layer/adhesive buffer layer/glass substrate.

A protective film (500) may be formed on the uppermost layer of the flexible hybrid cover window according to the present disclosure. That is, when the TPI layer (310) is formed on the front surface, or both of the front and back surfaces of the glass substrate (100), a protective film (500) such as PET may be formed and provided on the outermost layer of the hybrid structure to protect the hybrid structure. If the user wants to apply the flexible hybrid cover window according to the present disclosure on the display panel, the user uses the device after removing the protective film (500).

In addition, a method of manufacturing a flexible hybrid cover window, according to the present disclosure, including a flat portion formed on a flat area of a flexible display and a folding portion, which is formed in succession to the flat portion formed on the folding area of the flexible display, the method includes: a first step of loading a glass substrate (100) on a carrier substrate (10); a second step of forming an adhesive buffer layer (200) on the glass substrate (100); a third step of forming a TPI layer (310) on the adhesive buffer layer (200); a fourth step of forming a hybrid structure including a TPI layer/adhesive buffer layer/glass substrate by curing the adhesive buffer layer (200) by applying ultraviolet rays to either the glass substrate (100) or the TPI layer (310) or to both the glass substrate (100) or the TPI layer (310); and a fifth step of separating the hybrid structure from the carrier substrate (10), in which the TPI layer (310) has a UV cut-off wavelength of less than 380 nm.

The carrier substrate (10) is capable of stably loading a thin glass substrate (100) (first step), and any material such as glass, ceramic, or metal may be used. As an embodiment of the present disclosure, the carrier substrate (10) is formed with a guide part protruding upward on the side. This is to support the shape of the adhesive buffer layer (200) when forming the adhesive buffer layer (200) on the glass substrate (100) and to guide the adhesive buffer layer (200) to be formed on the side surface of the glass substrate (100).

After loading the glass substrate (100) on the carrier substrate (10), the adhesive buffer layer (200) is formed on the glass substrate (100) (second step). The adhesive buffer layer (200) is provided by OCR and is formed by coating the glass substrate (100) with a thickness in a range of 1 to 75 μm.

Then, the TPI layer (310) is formed on the adhesive buffer layer (200) with a thickness of 1 to 50 μm (third step), and the adhesive buffer layer (200) is cured by applying ultraviolet rays to either the glass substrate (100) or the TPI layer (310) or to both the glass substrate (100) or the TPI layer (310) to form a hybrid structure including the TPI layer/adhesive buffer layer/glass substrate (100) (fourth step). The TPI layer (310), according to the present disclosure, has a UV cut-off wavelength of 380 nm or less.

The TPI layer (310) may be formed on the front surface or both the front and back surfaces of the glass substrate (100), respectively. In this case, the hybrid structure on the front surface is first formed using a carrier substrate (10), and then the hybrid structure on the back surface is formed.

That is when the TPI layer (310) is formed on both the front and back surfaces of the glass substrate (100), respectively after the TPI layer (310) is formed on the front surface of the glass substrate through the first to fourth steps, the TPI layer (310) is formed on the back surface of the glass substrate (100) by forming the adhesive buffer layer (200) on the back surface of the glass substrate (100) and forming the TPI layer (310) thereof.

Here, ultraviolet rays are applied once more to cure the adhesive buffer layer (200) formed on the back surface of the glass substrate (100), and in this case, ultraviolet rays are applied from the glass substrate side or the TPI layer (310) side as necessary.

After forming the hybrid structure, the side portions of the hybrid structure, that is, both side ends of the hybrid structure, are cut in a vertical direction with respect to the carrier substrate (10) or the glass substrate (100) to trim the side portions of the hybrid structure. A laser is used as a means for cutting the side portions of the hybrid structure.

By separating the hybrid structure from the carrier substrate (10) (fifth step), the flexible hybrid cover window, according to the present disclosure, is provided.

As such, the present disclosure provides a flexible hybrid cover window by implementing a TPI layer (310) on one side or both sides of a glass substrate (100) in a complex manner, thereby reducing the overall thickness of the flexible cover window while maximally maintaining the unique texture of the glass, absorbing impact such as a pen-drop by the TPI layer (310), and minimizing deformation in the folding portion by the adhesive buffer layer (200) to further improve impact resistance and durability. In addition, the ultraviolet transmission band region of the TPI layer (310) is enlarged to adjust the degree of curing of the adhesive buffer layer (200), thereby promoting stable bonding between the glass substrate (100) and the adhesive buffer layer (200). Hereinafter, various embodiments of the present disclosure will be described using drawings. Redundant descriptions above will be omitted.

Example 1

Figure 2:
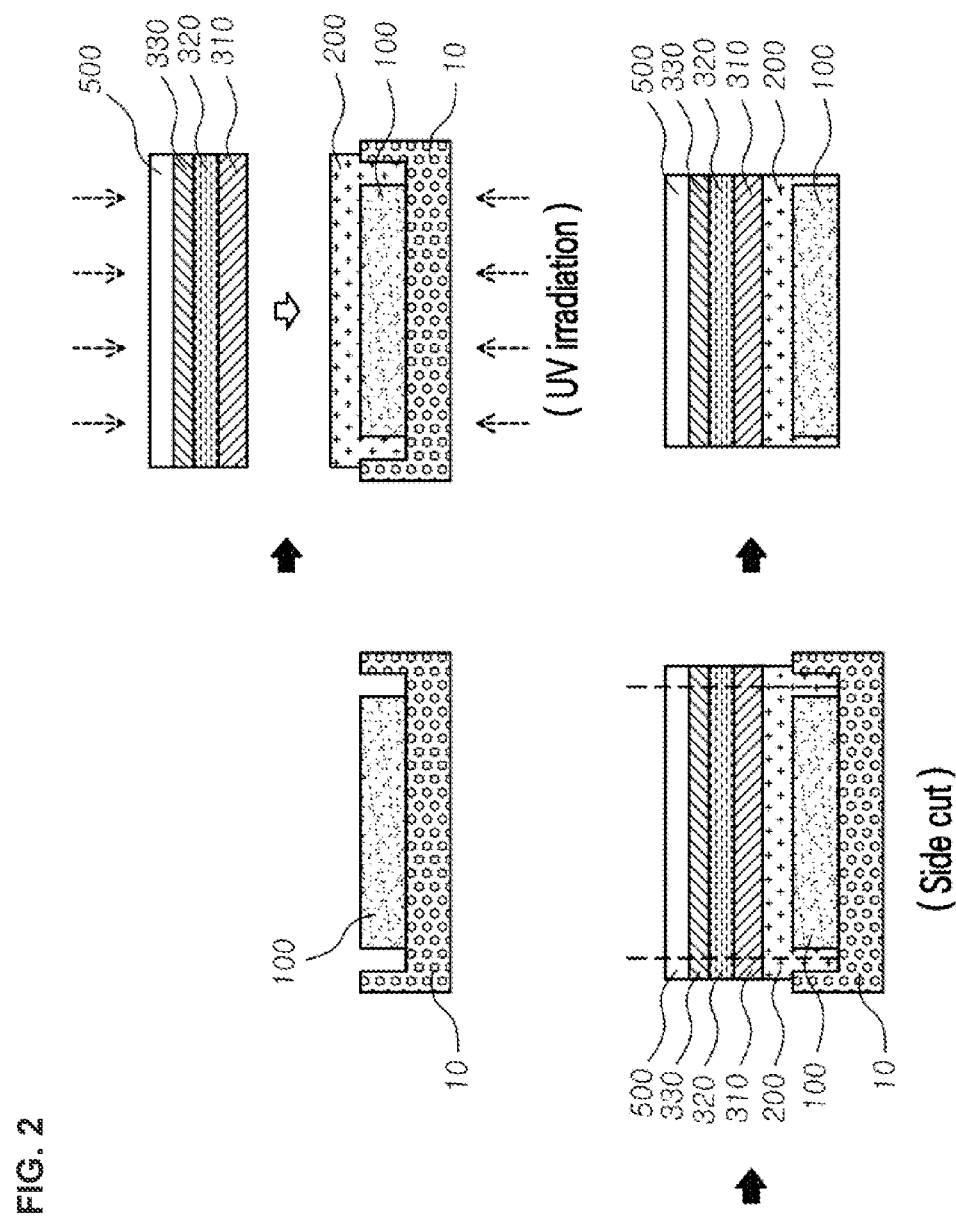
FIGS. 2 to 12 are schematic diagrams showing various embodiments of the present disclosure.

FIG. 2 shows Example 1 of the present disclosure, in which a TPI layer (310) is formed on the front surface of a glass substrate (100), and there is no bezel printed layer (400).

A glass substrate (100) is loaded on a carrier substrate (10), an adhesive buffer layer (200) is formed on the glass substrate (100), and then a structure in which the AF coating layer/hard coating layer/TPI layer is integrally formed is laminated on the adhesive buffer layer (200). Here, after forming the AF coating layer (330), a protective film (500) may be formed, and the protective film (500) may be formed later.

Thereafter, ultraviolet rays are applied to either the glass substrate (100) or the TPI layer (310) or to both the glass substrate (100) or the TPI layer (310) to cure the adhesive buffer layer (200) and laminate the glass substrate (100) and the TPI layer (310) to form a hybrid structure composed of an AF coating layer/hard coating layer/TPI layer/adhesive buffer layer/glass substrate.

By cutting the side portion of the hybrid structure in a vertical direction to the carrier substrate (10) using a laser and separating the hybrid structure from the carrier substrate (10), and then the flexible hybrid cover window according to the present disclosure is provided.

Example 2

Figure 3:
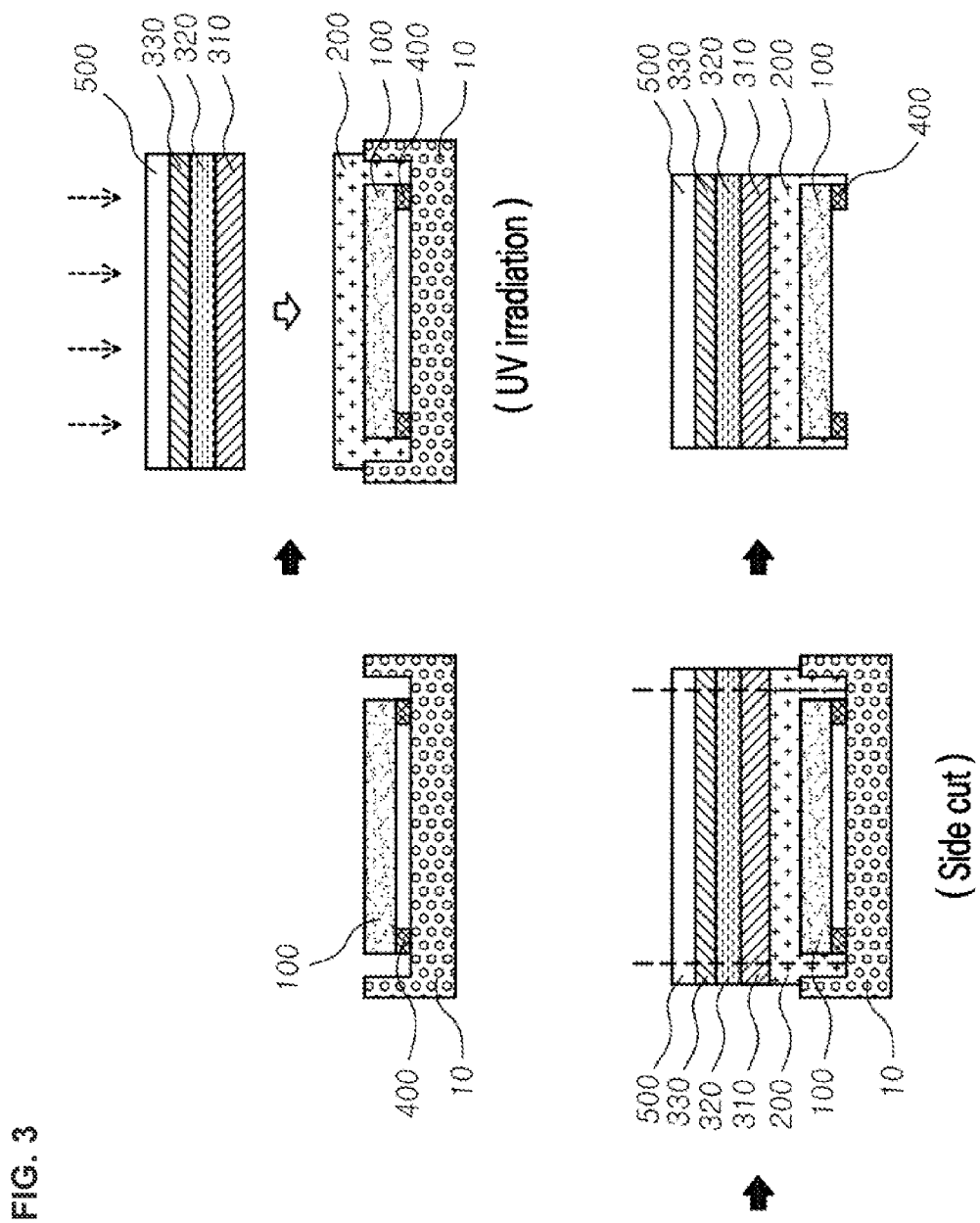

FIG. 3 shows Example 2 of the present disclosure, in which a TPI layer (310) is formed on the front surface of a glass substrate (100), and a bezel printed layer (400) is formed on the glass substrate (100).

A glass substrate (100) on which a bezel printed layer (400) is formed is loaded on a carrier substrate (10), an adhesive buffer layer (200) is formed on the glass substrate (100), and then a structure in which the AF coating layer/hard coating layer/TPI layer is integrally formed is laminated on the adhesive buffer layer (200). Here, after forming the AF coating layer (330), a protective film (500) may be formed, and the protective film (500) may be formed later.

Thereafter, ultraviolet rays are applied to the direction of the TPI layer (310) to cure the adhesive buffer layer (200) to laminate the glass substrate (100) and the TPI layer (310) to form a hybrid structure composed of an AF coating layer/hard coating layer/TPI layer/adhesive buffer layer/glass substrate.

Here, since the bezel printed layer (400) is formed on the glass substrate (100) when ultraviolet rays are applied to the glass substrate (100), the bezel printed layer (400) serves as an ultraviolet transmittance barrier so that the adhesive buffer layer (200) is incompletely cured in that region. Therefore, in this Example, the adhesive buffer layer (200) should be cured by irradiating ultraviolet rays in the direction of the TPI layer (310).

By cutting the side portion of the hybrid structure in a vertical direction to the carrier substrate (10) using a laser and separating the hybrid structure from the carrier substrate (10), and then the flexible hybrid cover window according to the present disclosure is provided.

Example 3

Figure 4:
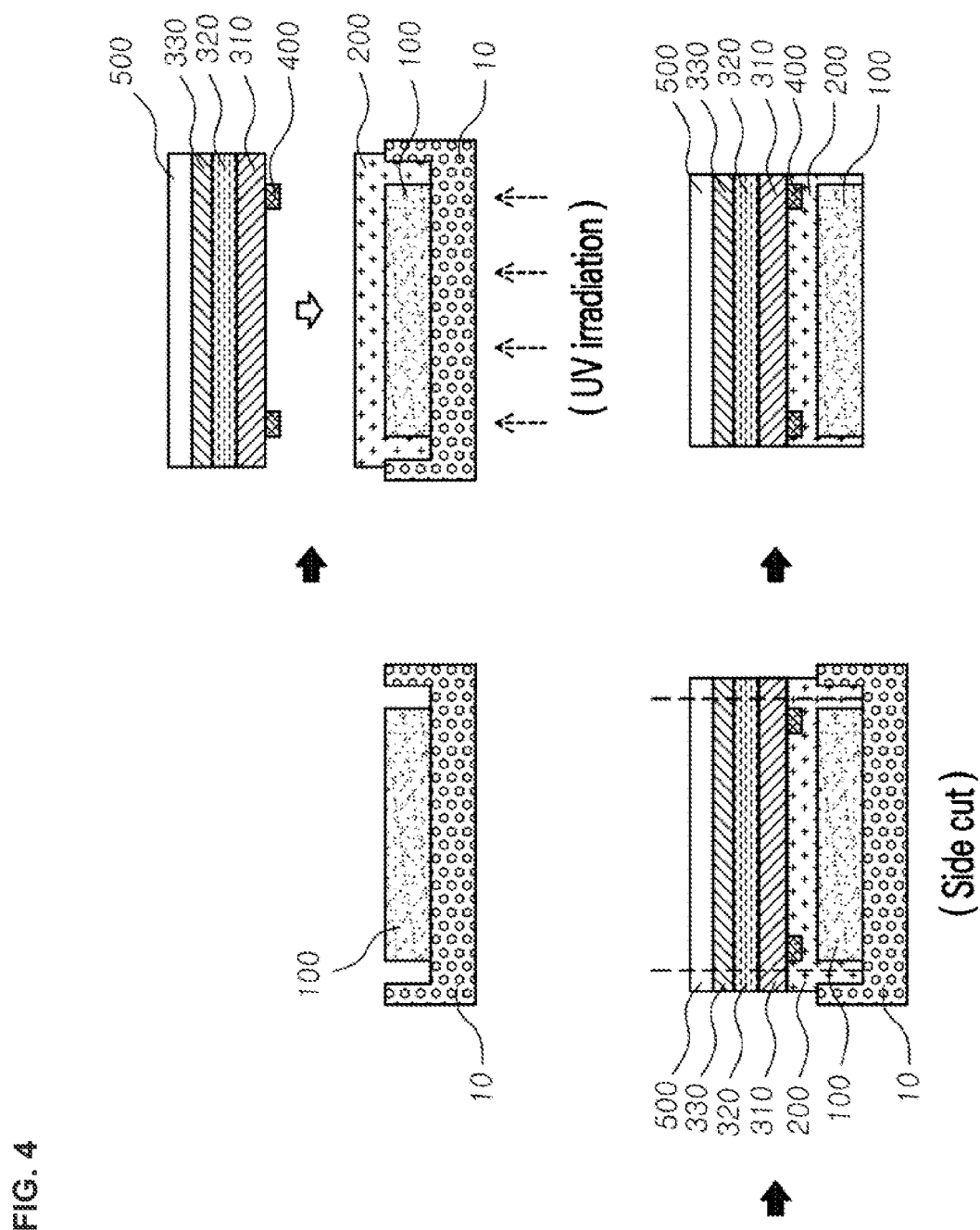

FIG. 4 shows Example 3 of the present disclosure, in which a TPI layer (310) is formed on the front surface of a glass substrate (100), and a bezel printed layer (400) is formed on the TPI layer (310).

A glass substrate (100) is loaded on a carrier substrate (10), an adhesive buffer layer (200) is formed on the glass substrate (100), and then a structure in which the AF coating layer/hard coating layer/TPI layer is integrally formed is laminated on the adhesive buffer layer (200). Here, a bezel printed layer (400) is formed under the TPI layer (310). In addition, after forming the AF coating layer (330), a protective film (500) may be formed, and the protective film (500) may be formed later.

Thereafter, ultraviolet rays are applied to the glass substrate (100) to cure the adhesive buffer layer (200) to laminate the glass substrate (100) and the TPI layer (310) to form a hybrid structure composed of an AF coating layer/hard coating layer/TPI layer/adhesive buffer layer/glass substrate.

Here, since the bezel printed layer (400) is formed on the TPI layer (310) when ultraviolet rays are applied to the TPI layer (310), the bezel printed layer (400) serves as an ultraviolet 20) transmittance barrier so that the adhesive buffer layer (200) is incompletely cured in that region. Therefore, in this Example, the adhesive buffer layer (200) should be cured by irradiating ultraviolet rays in the direction of the glass substrate (100).

By cutting the side portion of the hybrid structure in a vertical direction to the carrier substrate (10) using a laser and separating the hybrid structure from the carrier substrate (10), and then the flexible hybrid cover window according to the present disclosure is provided.

Example 4

Figure 5:
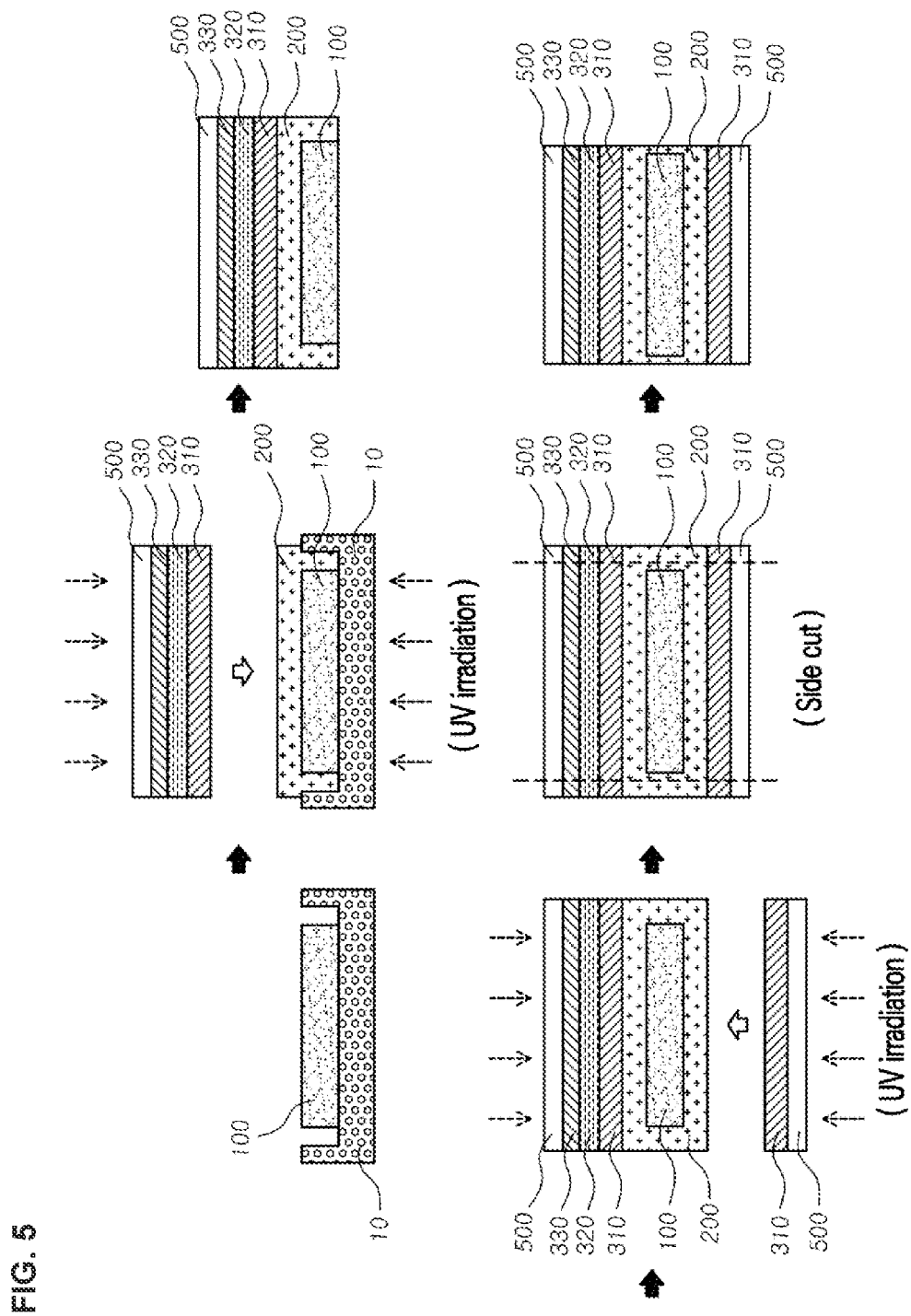

FIG. 5 shows Example 4 of the present disclosure, in which TPI layers (310) are formed on both sides of a glass substrate (100), and there is no bezel printed layer (400). This is a case in which a functional layer is formed only in the front direction of the glass substrate (100), and only a TPI layer (310) is formed without a functional layer in the back direction.

A glass substrate (100) is loaded on a carrier substrate (10), an adhesive buffer layer (200) is formed on the glass substrate (100), and then a structure in which the AF coating layer/hard coating layer/TPI layer is integrally formed is laminated on the adhesive buffer layer (200). Here, after forming the AF coating layer (330), a protective film (500) may be formed, and the protective film (500) may be formed later.

Thereafter, ultraviolet rays are applied to either the glass substrate (100) or the TPI layer (310) or to both the glass substrate (100) or the TPI layer (310) to cure the adhesive buffer layer (200) and laminate the glass substrate (100) and the TPI layer (310) to form a hybrid structure composed of an AF coating layer/hard coating layer/TPI layer/adhesive buffer layer/glass substrate, and separating the hybrid structure from the carrier substrate (10).

Then, the adhesive buffer layer (200) is formed on the back surface of the hybrid structure, and a TPI layer (310) is laminated on the adhesive buffer layer (200). Here, a protective film (500) is formed on the outermost layer.

Thereafter, ultraviolet rays are secondarily applied to either the glass substrate (100) or the TPI layer (310) or to both the glass substrate (100) or the TPI layer (310) to cure the adhesive buffer layer (200) formed on the back surface of the glass substrate (100) to laminate the glass substrate (100) and the TPI layer (310). Accordingly, a hybrid structure composed of the AF coating layer/hard coating layer/TPI layer/adhesive buffer layer/glass substrate/TPI layer is formed.

By cutting the side portion of the hybrid structure in the vertical direction using a laser, the flexible hybrid cover window according to the present disclosure is provided.

Example 5

Figure 6:
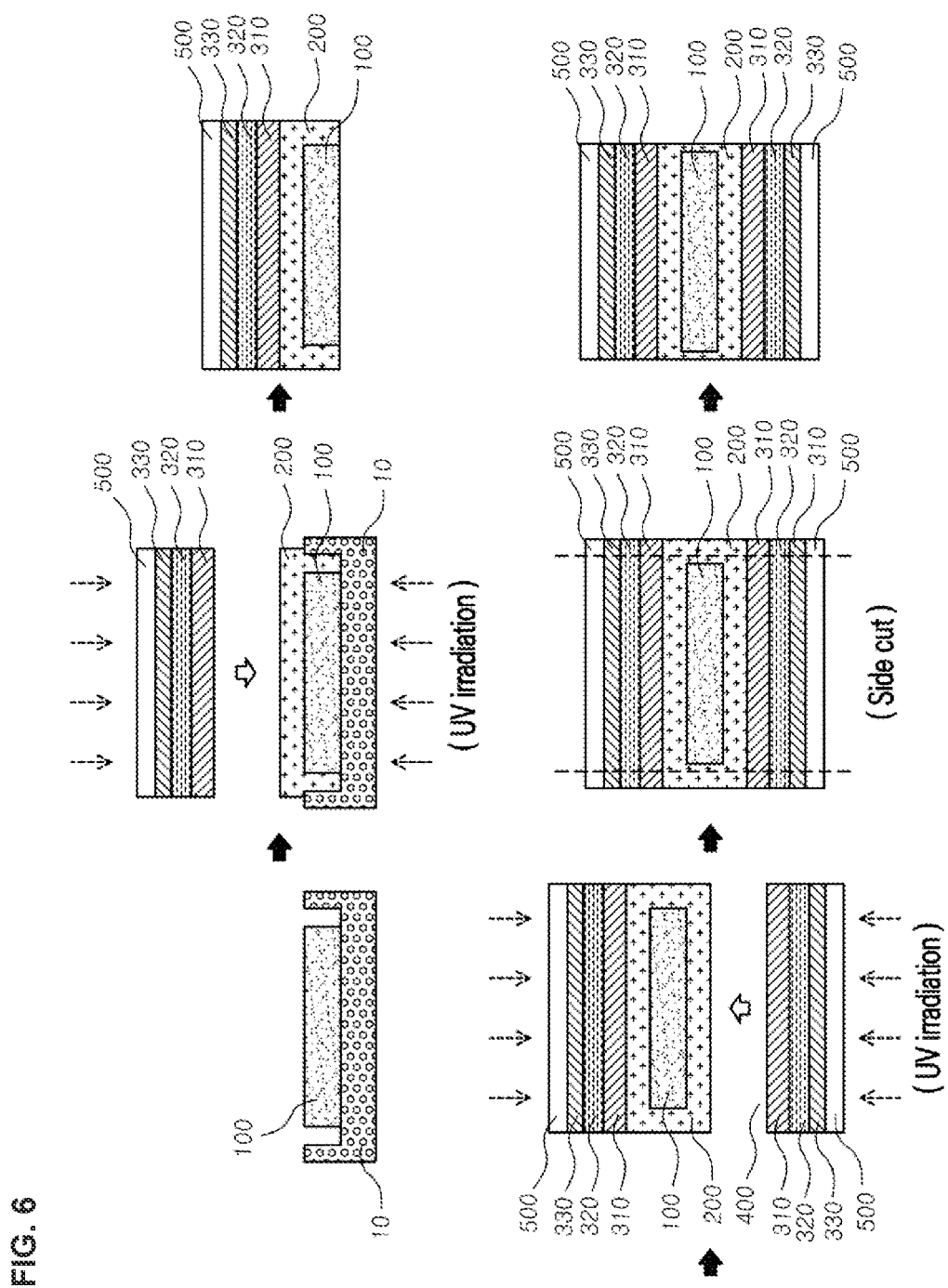

FIG. 6 shows Example 5 of the present disclosure, in which a TPI layer (310) is formed on both surfaces of a glass substrate (100), and when there is no bezel printing layer, a functional layer is formed on the TPI layer (310) in both directions of the glass substrate (100).

A glass substrate (100) is loaded on a carrier substrate (10), an adhesive buffer layer (200) is formed on the glass substrate (100), and then a structure in which the AF coating layer/hard coating layer/TPI layer is integrally formed is laminated on the adhesive buffer layer (200). Here, after forming the AF coating layer (330), a protective film (500) may be formed, and the protective film (500) may be formed later.

Thereafter, ultraviolet rays are applied to either the glass substrate (100) or the TPI layer (310) or to both the glass substrate (100) or the TPI layer (310) to cure the adhesive buffer layer (200) and laminate the glass substrate (100) and the TPI layer (310) to form a hybrid structure composed of an AF coating layer/hard coating layer/TPI layer/adhesive buffer layer/glass substrate, and separating the hybrid structure from the carrier substrate (10).

In addition, the adhesive buffer layer (200) is formed on the back surface of the hybrid structure, and a structure composed of an AF coating layer/hard coating layer/TPI layer is laminated on the adhesive buffer layer (200) so that the adhesive buffer layer (200), the TPI layer (310), the hard coating layer (320), and the AF coating layer (330) are symmetrically formed around the glass substrate (100). Here, a protective film (500) is formed on the outermost layer.

Thereafter, ultraviolet rays are secondarily applied to either the glass substrate (100) or the TPI layer (310) or to both the glass substrate (100) or the TPI layer (310) to cure the adhesive buffer layer (200) formed on the back surface of the glass substrate (100) to laminate the glass substrate (100) and the TPI layer (310). Accordingly, a hybrid structure composed of the AF coating layer/hard coating layer/TPI layer/adhesive buffer layer/glass substrate/TPI layer/hard 20) coating layer/AF coating layer is formed.

By cutting the side portion of the hybrid structure in the vertical direction using a laser, the flexible hybrid cover window according to the present disclosure is provided.

Example 6

Figure 7:
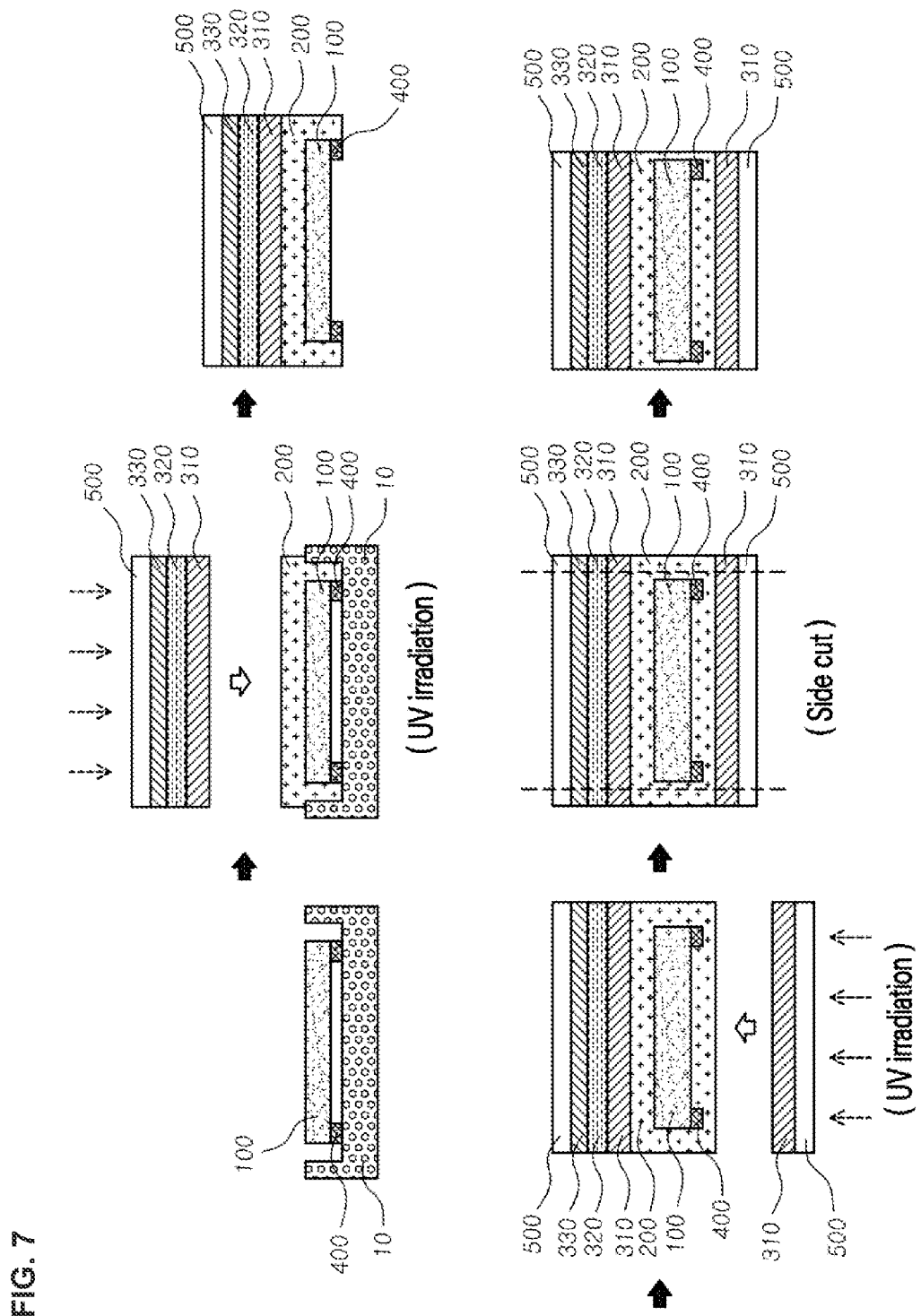

FIG. 7 shows Example 6 of the present disclosure, in which TPI layers (310) are formed on both sides of a glass substrate (100) and a bezel printed layer (400) is on the glass substrate (100), a functional layer is formed only in the front direction of the glass substrate (100), and only the TPI layer (310) is formed without a functional layer in the back direction.

A glass substrate (100) on which a bezel printed layer (400) is formed is loaded on a carrier substrate (10), an adhesive buffer layer (200) is formed on the glass substrate (100), and then a structure in which the AF coating layer/hard coating layer/TPI layer is integrally formed is laminated on the adhesive buffer layer (200). Here, after forming the AF coating layer (330), a protective film (500) may be formed, and the protective film (500) may be formed later.

Thereafter, ultraviolet rays are applied to the TPI layer (310) to cure the adhesive buffer layer (200) to laminate the glass substrate (100) and the TPI layer (310) to form a hybrid structure composed of an AF coating layer/hard coating layer/TPI layer/adhesive buffer layer/glass substrate, and the hybrid structure is separated from the carrier substrate (10).

Then, the adhesive buffer layer (200) is formed on the back surface of the hybrid structure, and a TPI layer (310) is laminated on the adhesive buffer layer (200). Here, a protective film (500) is formed on the outermost layer.

Thereafter, ultraviolet rays are secondarily applied to the TPI layer (310) formed on the back surface of the glass substrate (100) to cure the adhesive buffer layer (200) formed on the back surface of the glass substrate (100) to laminate the glass substrate (100) and the TPI layer (310). Accordingly, a hybrid structure composed of the AF coating layer/hard coating layer/TPI layer/adhesive buffer layer/glass substrate/TPI layer is formed.

By cutting the side portion of the hybrid structure in the vertical direction using a laser, the flexible hybrid cover window according to the present disclosure is provided.

Example 7

Figure 8:
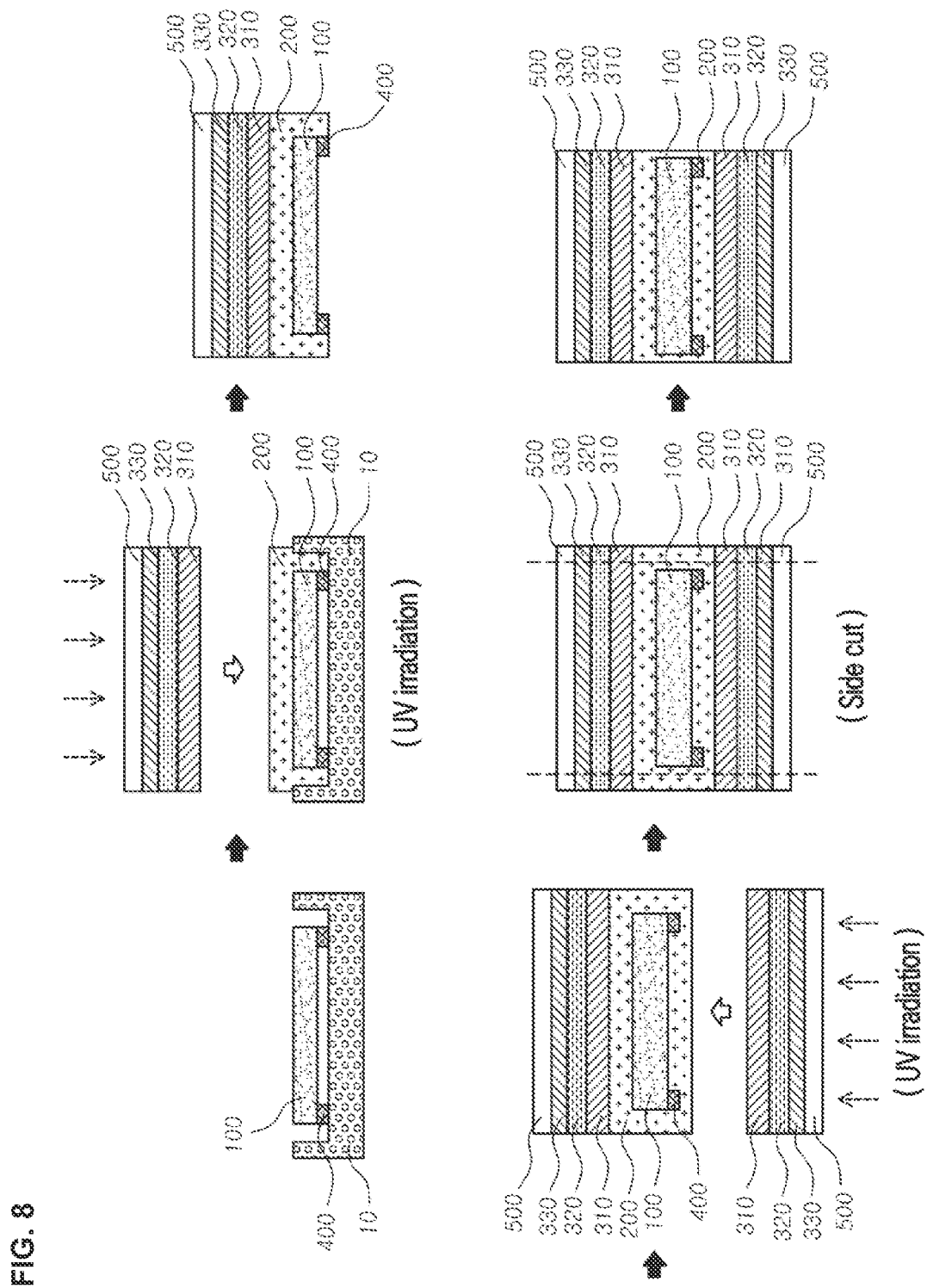

FIG. 8 shows Example 7 of the present disclosure, in which TPI layers (310) are formed on both surfaces of a glass substrate (100), and when the bezel printing layer is on the glass substrate (100), functional layers are formed on the TPI layer (310) in both directions of the glass substrate (100).

A glass substrate (100) on which a bezel printed layer (400) is formed is loaded on a carrier substrate (10), an adhesive buffer layer (200) is formed on the glass substrate (100), and then a structure in which the AF coating layer/hard coating layer/TPI layer is integrally formed is laminated on the adhesive buffer layer (200). Here, after forming the AF coating layer (330), a protective film (500) may be formed, and the protective film (500) may be formed later.

Thereafter, ultraviolet rays are applied to the TPI layer (310) to cure the adhesive buffer layer (200) to laminate the glass substrate (100) and the TPI layer (310) to form a hybrid structure composed of an AF coating layer/hard coating layer/TPI layer/adhesive buffer layer/glass substrate, and the hybrid structure is separated from the carrier substrate (10).

In addition, the adhesive buffer layer (200) is formed on the back surface of the hybrid structure, and a structure composed of an AF coating layer/hard coating layer/TPI layer is laminated on the adhesive buffer layer (200) so that the adhesive buffer layer (200), the TPI layer (310), the hard coating layer (320), and the AF coating layer (330) are symmetrically formed around the glass substrate (100). Here, a protective film (500) is formed on the outermost layer.

Thereafter, ultraviolet rays are secondarily applied to the TPI layer (310) formed on the back surface of the glass substrate (100) to cure the adhesive buffer layer (200) formed on the back surface of the glass substrate (100) to laminate the glass substrate (100) and the TPI layer (310). Accordingly, a hybrid structure composed of the AF coating layer/hard coating layer/TPI layer/adhesive buffer layer/glass substrate/TPI layer/hard coating layer/AF coating layer is formed.

By cutting the side portion of the hybrid structure in the vertical direction using a laser, the flexible hybrid cover window according to the present disclosure is provided.

Example 8

Figure 9:
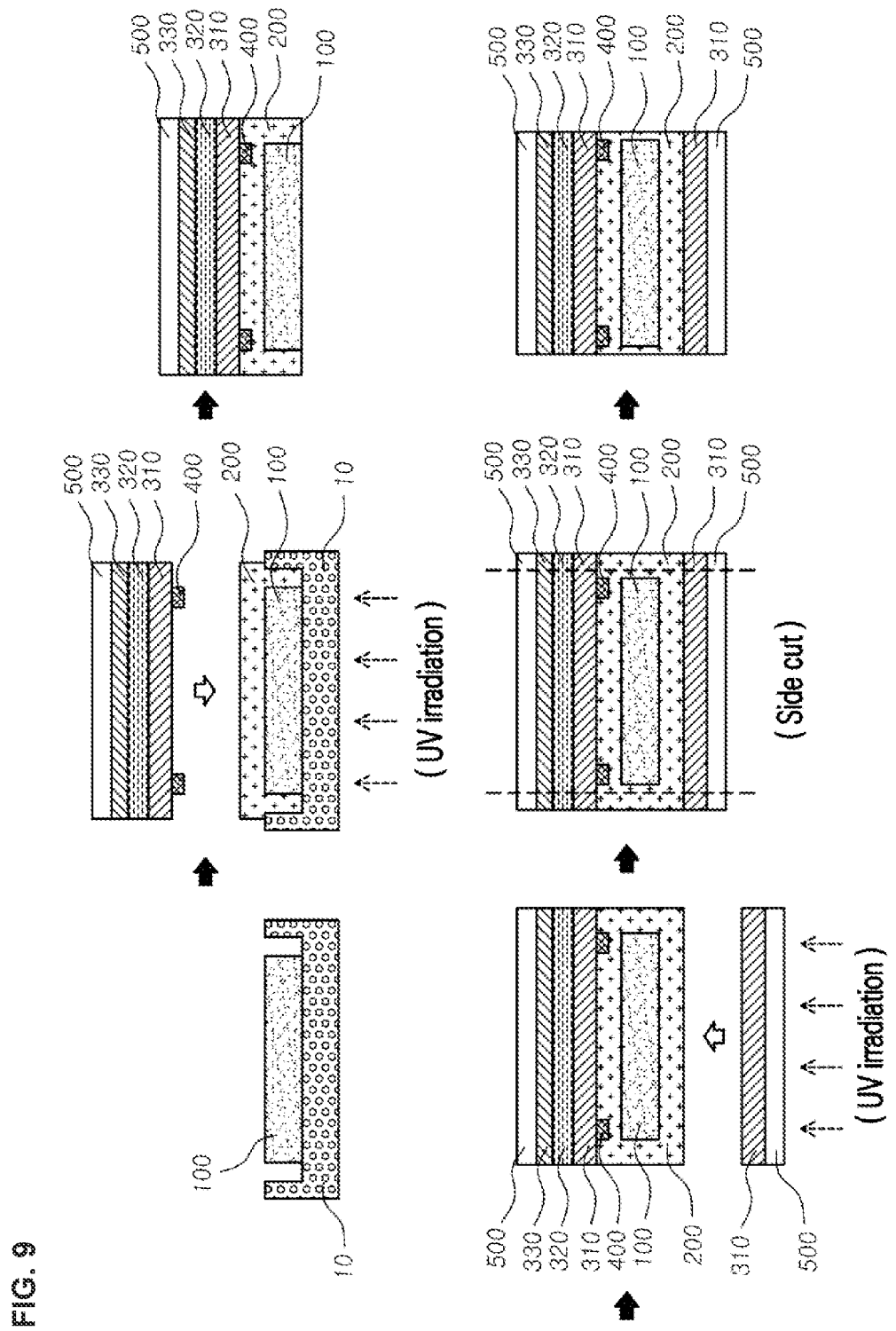

FIG. 9 shows Example 8 of the present disclosure, in which TPI layers (310) are formed on both sides of a glass substrate (100) and a bezel printed layer (400) is on the TPI layer (310), a 20) functional layer is formed only in the front direction of the glass substrate (100), and only the TPI layer (310) is formed without a functional layer in the back direction.

A glass substrate (100) is loaded on a carrier substrate (10), an adhesive buffer layer (200) is formed on the glass substrate (100), and then a structure in which the AF coating layer/hard coating layer/TPI layer is integrally formed is laminated on the adhesive buffer layer (200). Here, a bezel printed layer (400) is formed below the TPI layer (310). In addition, after forming the AF coating layer (330), a protective film (500) may be formed, and the protective film (500) may be formed later.

Thereafter, ultraviolet rays are applied to the glass substrate (100) to cure the adhesive buffer layer (200) to laminate the glass substrate (100) and the TPI layer (310) to form a hybrid structure composed of an AF coating layer/hard coating layer/TPI layer/adhesive buffer layer/glass substrate, and the hybrid structure is separated from the carrier substrate (10).

Then, the adhesive buffer layer (200) is formed on the back surface of the hybrid structure, and a TPI layer (310) is laminated on the adhesive buffer layer (200). Here, a protective film (500) is formed on the outermost layer.

Thereafter, ultraviolet rays are secondarily applied to the TPI layer (310) formed on the back surface of the glass substrate (100) to cure the adhesive buffer layer (200) formed on the back surface of the glass substrate (100) to laminate the glass substrate (100) and the TPI layer (310). Accordingly, a hybrid structure composed of the AF coating layer/hard coating layer/TPI layer/adhesive buffer layer/glass substrate/TPI layer is formed.

By cutting the side portion of the hybrid structure in the vertical direction using a laser, the flexible hybrid cover window according to the present disclosure is provided.

Example 9

Figure 10:
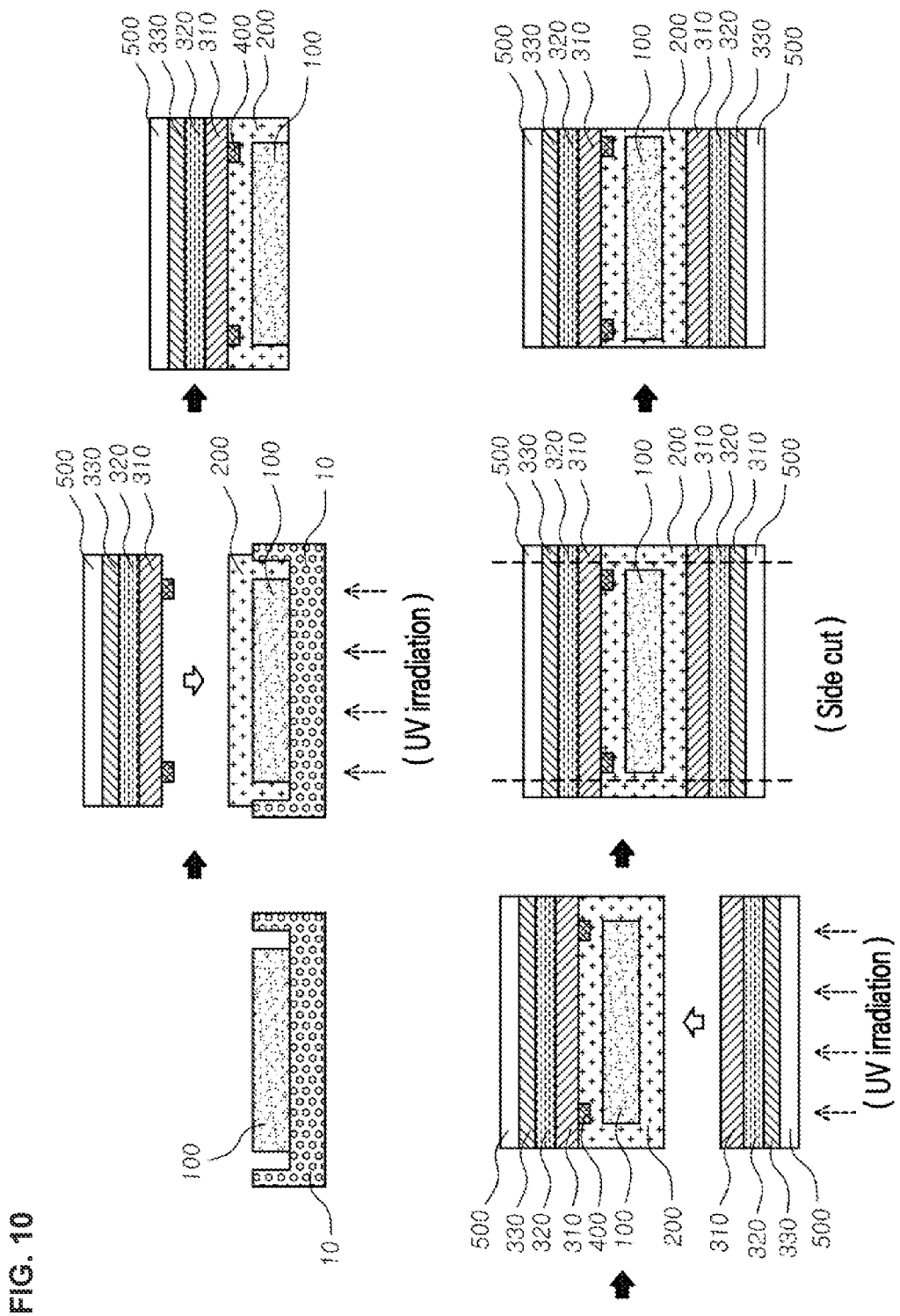

FIG. 10 shows Example 9 of the present disclosure, in which TPI layers (310) are formed on both surfaces of a glass substrate (100), and when the bezel printing layer is on the TPI layer (310), functional layers are formed on the TPI layer (310) in both directions of the glass substrate (100).

A glass substrate (100) is loaded on a carrier substrate (10), an adhesive buffer layer (200) is formed on the glass substrate (100), and then a structure in which the AF coating layer/hard coating layer/TPI layer is integrally formed is laminated on the adhesive buffer layer (200). Here, a bezel printed layer (400) is formed below the TPI layer (310). In addition, after forming the AF coating layer (330), a protective film (500) may be formed, and the protective film (500) may be formed later.

Thereafter, ultraviolet rays are applied to the glass substrate (100) to cure the adhesive buffer layer (200) to laminate the glass substrate (100) and the TPI layer (310) to form a hybrid structure composed of an AF coating layer/hard coating layer/TPI layer/adhesive buffer layer/glass substrate, and the hybrid structure is separated from the carrier substrate (10).

In addition, the adhesive buffer layer (200) is formed on the back surface of the hybrid structure, and a structure composed of an AF coating layer/hard coating layer/TPI layer is laminated on the adhesive buffer layer (200) so that the adhesive buffer layer (200), the TPI layer (310), the hard coating layer (320), and the AF coating layer (330) are symmetrically formed around the glass substrate (100). Here, a protective film (500) is formed on the outermost layer.

Thereafter, ultraviolet rays are secondarily applied to the TPI layer (310) formed on the back surface of the glass substrate (100) to cure the adhesive buffer layer (200) formed on the back surface of the glass substrate (100) to laminate the glass substrate (100) and the TPI layer (310). Accordingly, a hybrid structure composed of the AF coating layer/hard coating layer/TPI layer/adhesive buffer layer/glass substrate/TPI layer/hard coating layer/AF coating layer is formed.

By cutting the side portion of the hybrid structure in the vertical direction using a laser, the flexible hybrid cover window according to the present disclosure is provided.

Example 10

Figure 11:
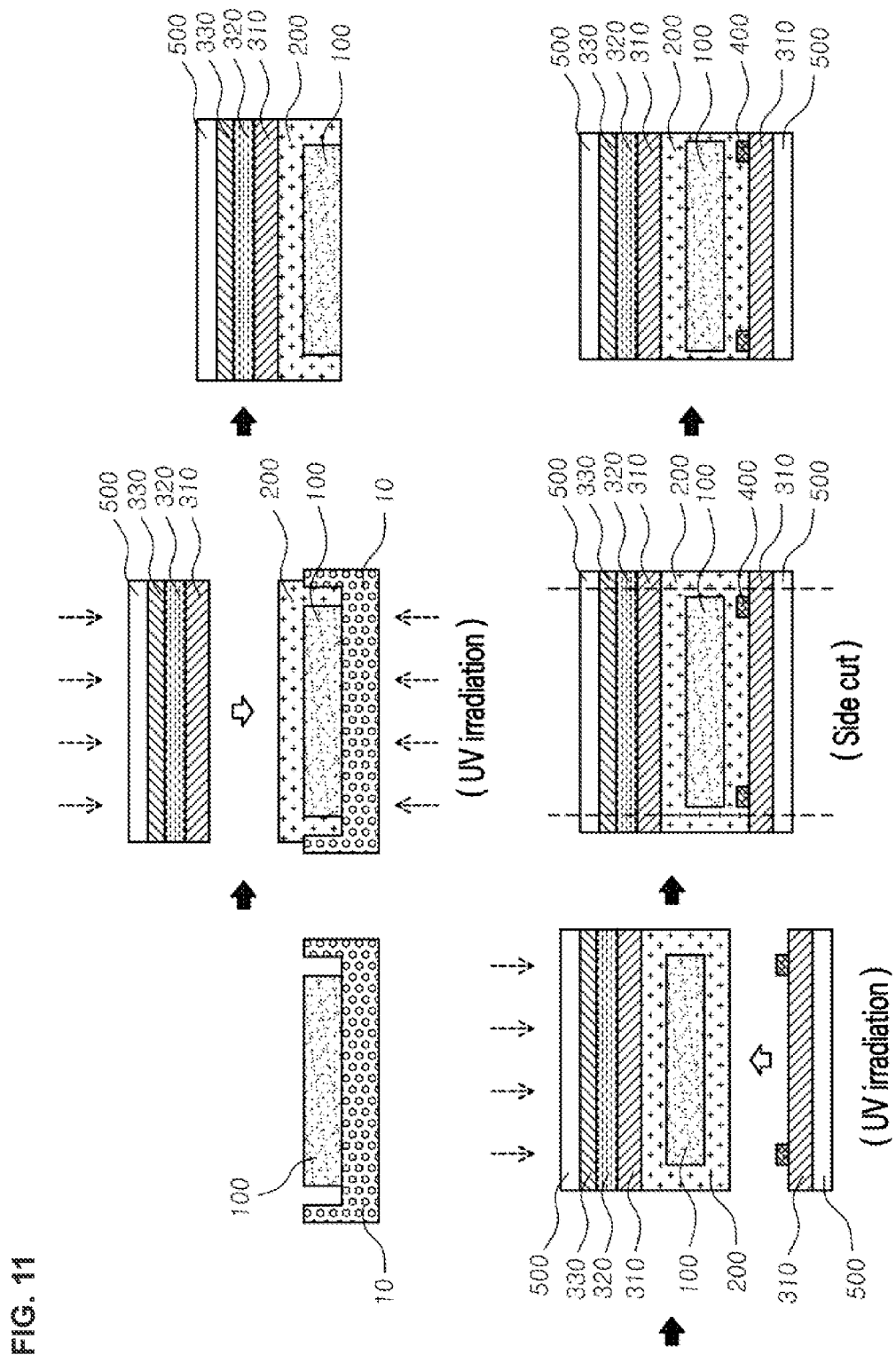

FIG. 11 shows Example 10 of the present disclosure, in which TPI layers (310) are formed on both sides of a glass substrate (100), and a bezel printed layer (400) is on the TPI layer (310) formed on the back surface of the glass substrate (100), a functional layer is formed only in the front direction of the glass substrate (100), and only the TPI layer (310) is formed without a functional layer in the back direction.

A glass substrate (100) is loaded on a carrier substrate (10), an adhesive buffer layer (200) is formed on the glass substrate (100), and then a structure in which the AF coating layer/hard coating layer/TPI layer is integrally formed is laminated on the adhesive buffer layer (200). Here, after forming the AF coating layer (330), a protective film (500) may be formed, and the protective film (500) may be formed later.

Thereafter, ultraviolet rays are applied to either the glass substrate (100) or the TPI layer (310) or to both the glass substrate (100) or the TPI layer (310) to cure the adhesive buffer layer (200) and laminate the glass substrate (100) and the TPI layer (310) to form a hybrid structure composed of an AF coating layer/hard coating layer/TPI layer/adhesive buffer layer/glass substrate, and separating the hybrid structure from the carrier substrate (10).

Then, the adhesive buffer layer (200) is formed on the back surface of the hybrid structure, and a TPI layer (310) is laminated on the adhesive buffer layer (200). Here, a bezel printed layer (400) is formed on the TPI layer (310) formed on the back surface of the glass substrate (100). In addition, a protective film (500) is formed on the outermost layer.

Thereafter, ultraviolet rays are secondarily applied to the TPI layer (310) formed on the front surface of the glass substrate (100) to cure the adhesive buffer layer (200) formed on the back surface of the glass substrate (100) to laminate the glass substrate (100) and the TPI layer (310). Accordingly, a hybrid structure composed of the AF coating layer/hard coating layer/TPI layer/adhesive buffer layer/ glass substrate/TPI layer is formed.

By cutting the side portion of the hybrid structure in the vertical direction using a laser, the flexible hybrid cover window according to the present disclosure is provided.

Example 11

Figure 12:
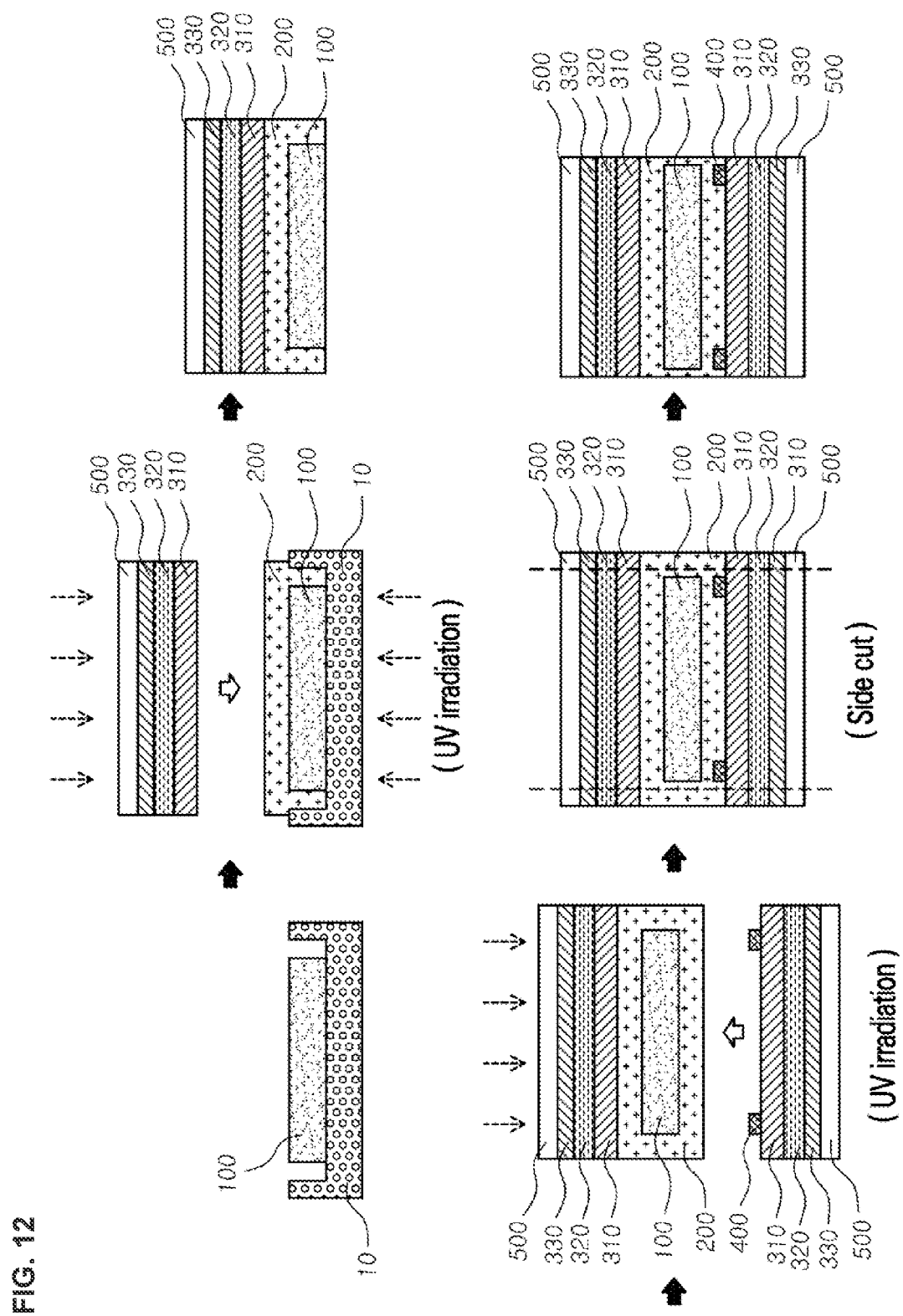

FIG. 12 shows Example 11 of the present disclosure, in which TPI layers (310) are formed on both surfaces of a glass substrate (100), and when the bezel printing layer is on the TPI layer (310) formed on the back surface of the glass substrate (100), functional layers are formed on the TPI layer (310) in both directions of the glass substrate (100).

A glass substrate (100) is loaded on a carrier substrate (10), an adhesive buffer layer (200) is formed on the glass substrate (100), and then a structure in which the AF coating layer/hard coating layer/TPI layer is integrally formed is laminated on the adhesive buffer layer (200). Here, after forming the AF coating layer (330), a protective film (500) may be formed, and the protective film (500) may be formed later.

Thereafter, ultraviolet rays are applied to either the glass substrate (100) or the TPI layer (310) or to both the glass substrate (100) or the TPI layer (310) to cure the adhesive buffer layer (200) and laminate the glass substrate (100) and the TPI layer (310) to form a hybrid structure composed of an AF coating layer/hard coating layer/TPI layer/adhesive buffer layer/glass substrate, and separating the hybrid structure from the carrier substrate (10).

In addition, the adhesive buffer layer (200) is formed on the back surface of the hybrid structure, and a structure composed of an AF coating layer/hard coating layer/TPI layer is laminated on the adhesive buffer layer (200) so that the adhesive buffer layer (200), the TPI layer (310), the hard coating layer (320), and the AF coating layer (330) are symmetrically formed around the glass substrate (100). Here, a bezel printed layer (400) is formed on the TPI layer (310) formed on the back surface of the glass substrate (100). In addition, a protective film (500) is formed on the outermost layer.

Thereafter, ultraviolet rays are secondarily applied to the TPI layer (310) formed on the front surface of the glass substrate (100) to cure the adhesive buffer layer (200) formed on the back surface of the glass substrate (100) to laminate the glass substrate (100) and the TPI layer (310). Accordingly, a hybrid structure composed of the AF coating layer/hard coating layer/TPI layer/adhesive buffer layer/ glass substrate/TPI layer/hard coating layer/AF coating layer is formed.

By cutting the side portion of the hybrid structure in the vertical direction using a laser, the flexible hybrid cover window according to the present disclosure is provided.

As such, the present disclosure relates to a flexible cover window and provides a flexible hybrid cover window in which a glass substrate (100) and a TPI layer (310) are combined.

In particular, in the present disclosure, since the UV cut-off wavelength of the TPI layer (310) is formed to be 380 nm or less, the transmission of ultraviolet rays for curing the adhesive buffer layer (200) is possible through the TPI layer (310). Therefore, it is possible to implement complete curing of the adhesive buffer layer (200) for bonding between the glass substrate (100) and the TPI layer (310), and the adhesion between the glass substrate (100) and the TPI layer (310) is excellent, thereby improving overall durability.

In addition, the transmission of ultraviolet rays is possible not only on the glass substrate (100) side but also on the TPI layer (310) side so that various variables in the structure of the product or manufacturing process can be accommodated. Therefore, the adhesive buffer layer (200) can be cured without an ultraviolet transmission barrier to the printed layer (400) even for products having various structures, for example, a product having a bezel printed layer (400) formed on the glass substrate (100) or TPI layer (310), thereby promoting convenience in the process.

In addition, the present disclosure provides a flexible hybrid cover window of a glass substrate and a TPI layer, thereby reducing the overall thickness of the flexible cover window while maximally maintaining the unique texture of the glass, absorbing impact such as a pen-drop by the TPI layer, and minimizing deformation in the folding portion by the adhesive buffer layer to further improve impact resistance and durability.

What is claimed is:

1. A flexible hybrid cover window comprising a flat portion formed on a flat area of a flexible display panel and a folding portion, which is formed in succession to the flat portion and formed on a folding area of the flexible display, the flexible hybrid cover window comprising:
   a glass substrate;
   a transparent polyimide (TPI) layer formed on the glass substrate;

an adhesive buffer layer formed between the glass substrate and the TPI layer,
wherein the TPI layer has an ultraviolet cut-off wavelength of 380 nm or less,
wherein the adhesive buffer layer is formed between the glass substrate and the TPI layer and formed on a side surface of the glass substrate in succession thereto,
wherein the adhesive buffer layer is made of optical clear resin (OCR), and
wherein the OCR adhesive buffer layer has a storage modulus in a range of 0.01 to 1 GPa.

2. The flexible hybrid cover window of claim 1, wherein the TPI layer is formed on the front surface of the glass substrate, or formed on each of the front surface and the back surface of the glass substrate.

3. The flexible hybrid cover window of claim 2, further comprising a functional layer, wherein the functional layer is formed on the TPI layer formed on the front surface, or the functional layer is formed on each of the TPI layers respectively formed on the front surface and back surface.

4. The flexible hybrid cover window of claim 3, wherein the functional layer is a hard coating layer, an anti-fingerprint (AF) coating layer or a stacked structure in which an AF coating layer is stacked on a hard coating layer.

5. The flexible hybrid cover window of claim 1, wherein a degree of curing of the adhesive buffer layer is adjusted by applying ultraviolet rays to either the glass substrate or the TPI layer or to both the glass substrate or the TPI layer.

6. The flexible hybrid cover window of claim 5, wherein the adhesive buffer layer is completely cured.

7. The flexible hybrid cover window of claim 5, wherein the adhesive buffer layer in the folding portion is less cured than the adhesive buffer layer in the flat portion.

8. The flexible hybrid cover window of claim 1, further comprising a printed layer formed on the glass substrate or the TPI layer.

9. The flexible hybrid cover window of claim 1, further comprising a protective film is formed on the outermost layer of the flexible cover window.

10. The flexible hybrid cover window of claim 1, wherein the TPI layer has a thickness in a range of 1 to 50 μm.

* * * * *